United States Patent Office 3,263,226
Patented July 26, 1966

3,263,226
MAGNETOSTRICTIVE PULSE INTERFERENCE DETECTOR
August E. Munich, Babylon, N.Y., assignor to the United States of America as represented by the Secretary of the Air Force
Filed Dec. 17, 1964, Ser. No. 419,257
3 Claims. (Cl. 343—17.1)

This invention relates to pulsed radar systems, and more particularly, to a system for removing interference from a radar display.

The pulse interference detector is a device which will recognize presence of interference pulses, rabbits, or random jamming pulses and will generate blanking gates to remove the interfering pulses from the radar video before the video is presented on the indicator console or sent to some data processing device. This device utilizes a magnetostrictive delay line as a storage element.

It is accordingly one object of the present invention to provide a device for removing most of the interference from a pulse signal by means of a magnetostrictive delay line.

It is another object of this invention to provide a new technique for removing random pulse interference from a radar display which is more reliable and uses less components than prior techniques.

These and other objects will be more fully understood from the following detailed description taken in conjunction with the drawings wherein.

The pulse interference detector, when used with a radar having only a normal receiver, must generate one blanking gate for each piece of interference. A pulse interference detector for a radar having a single canceller moving target indicator, must generate two blanking gates because for every one interference pulse into the canceller, there will be two pulses out due to the delay line of the canceller. A pulse interference detector for a radar having a double cascaded canceller must generate three blanking gates because for every one interference pulse into the canceller, there will be three pulses out due to the double delay line in the canceller. If the double canceller has feedback shaping, there will be many more pulses out of the canceller for every one put in. Instead of generating more than three blanking gates in the pulse interference detector, the feedback in the canceller was blanked out during the second and third interval thereby shifting the canceller to a simple double canceller for the duration of the two feedback blanking gates and thus eliminating all but the first three pulses out of the canceller.

The input to the pulse interference detector should be composite moving target indicator and normal video which has been quantized at some level sufficiently high above the noise level, about half normal amplitude, then range gated and combined in the same order as the video which will eventually be used in the display. This is done in order that if the display is moving target indicator video, it will automatically send moving target indicator video to the pulse interference detector and if the display is normal video it will automatically send normal video to the pulse interference detector.

The video to the pulse interference detector should be taken from the video switch which is processing the display video at an early enough time such that the quantized video to the pulse interference detector will precede by at least one microsecond the video in the video switch which will eventually be blanked out by the pulse interference detector gates.

Figure 1:
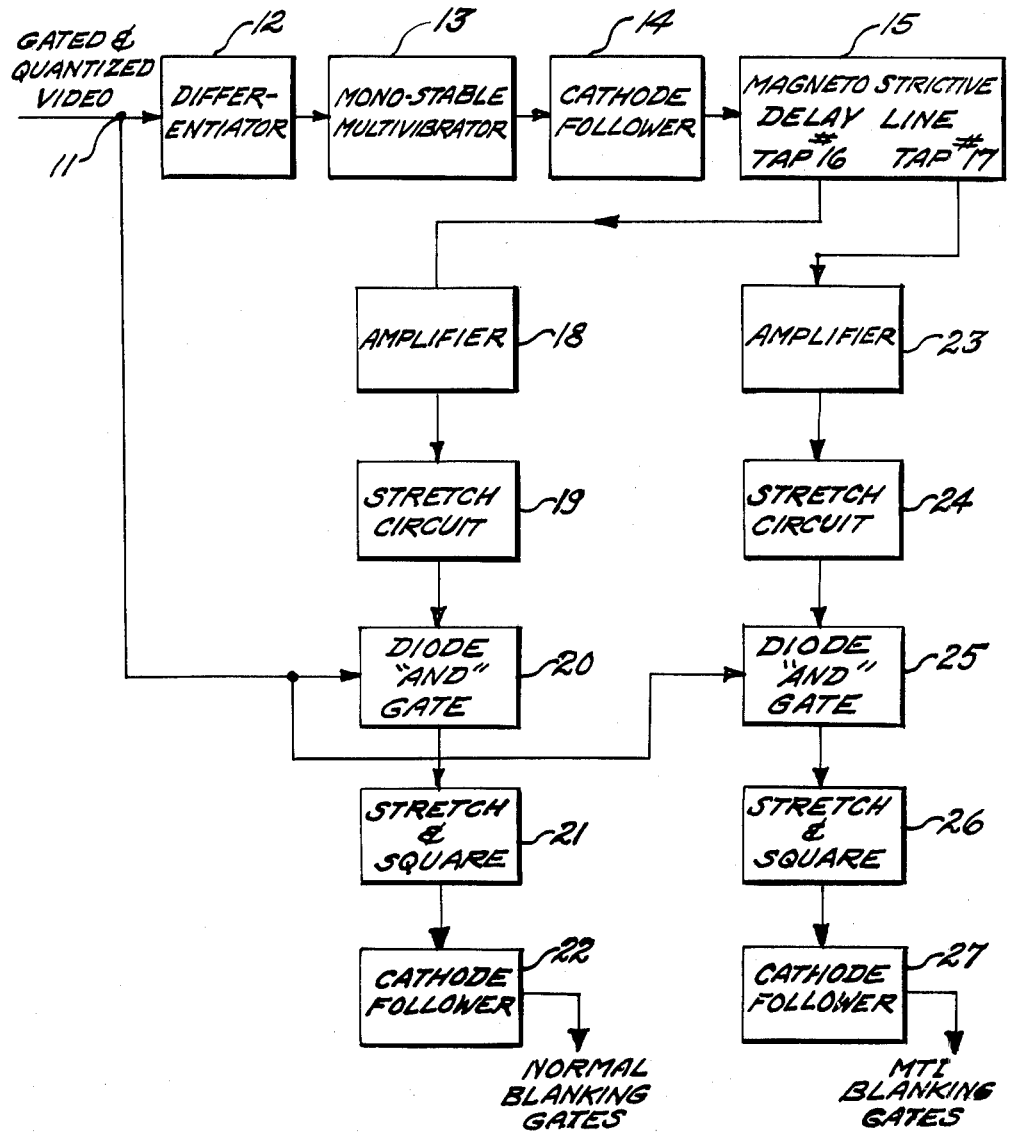
FIGURE 1 shows a block diagram of a pulse interference detector for both normal and moving target indicator video.

Referring now to FIGURE 1, the gated video at input terminal 11 is differentiated by differentiating circuit 12 in order that only the leading edge will trigger monostable multivibrator 13. The multivibrator standardizes the pulse width of all the video pulses, and cathode follower 14 is used to match the impedance of multivibrator 13 to that of magnetostrictive delay line 15.

A magnetostrictive delay line may be obtained which is optimized for different pulse widths, typical values of which may be one, two, and up to five microseconds. The multivibrator is designed with the optimized pulse width of the delay line in mind, but in no case should it be wider than the video input. FIGURE 1 is a pulse interference detector for both normal and moving target indicator video and as such has a magnetostrictive delay line with two taps, taps 16 and 17. The normal channel consists of tap 16 which is at a delay of one radar pulse period minus one microsecond. The pulses from tap 16 are very small and must be amplified by amplifier 18. The amplified signal is then stretched by stretch circuit 19 until it is wider than the video input.

The delayed video is now used as a blanking gate in diode "and" circuit 20 to blank out the video which is also presented to this switch. The net result is that the first pulse of a train of hits on a target will get through the "and" gate because there will be no delayed pulse from tap 16 to blank it out, but any following pulses will not get through the "and" gate because the second video will be blanked by the first video which has been delayed one pulse period, the third video will be blanked by the second video which has been delayed by one pulse period, and so on.

The output of "and" gate 20 is stretched and squared by stretch and square circuit 21 so as to bracket the video in the video switch. This is the normal blanking gate. If there is only one video pulse or a series of pulses which are not at the pulse recurrent frequency of the radar, they will all be passed through the "and" circuit to generate blanking gates which will be sent to the video switch where they will blank themselves out and thus not appear on the display to confuse or jam the operator.

In the event that the radar has a moving target indicator channel and has but a simple single canceller, tap #17 will be two pulse periods minus one microsecond. Moving target indicator blanking gates will be generated from the video input in the same manner as the normal blanking gates described above except that the first and the second pulses of a video train will get through diode gate 25 because the self-generated blanking gates coming from tap 17 do not appear until the third video has arrived at diode gate 25.

If the radar has a simple double cascaded canceller, tap 17 will be three pulse periods minus one microsecond. Moving target indicator blanking gates will be generated in the same manner described above except that now the first three video pulses will get through diode gate 25 and produce three moving target indicator blanking gates.

If the radar has a cascaded double canceller with velocity shaping, the pulse interference detector will be slightly more complicated due to the need for generating two feedback blanking gates during the second and third pulse period at a sufficiently early time to blank out the feedback in the canceller in order to switch the canceller to double cancellation.

Figure 2:
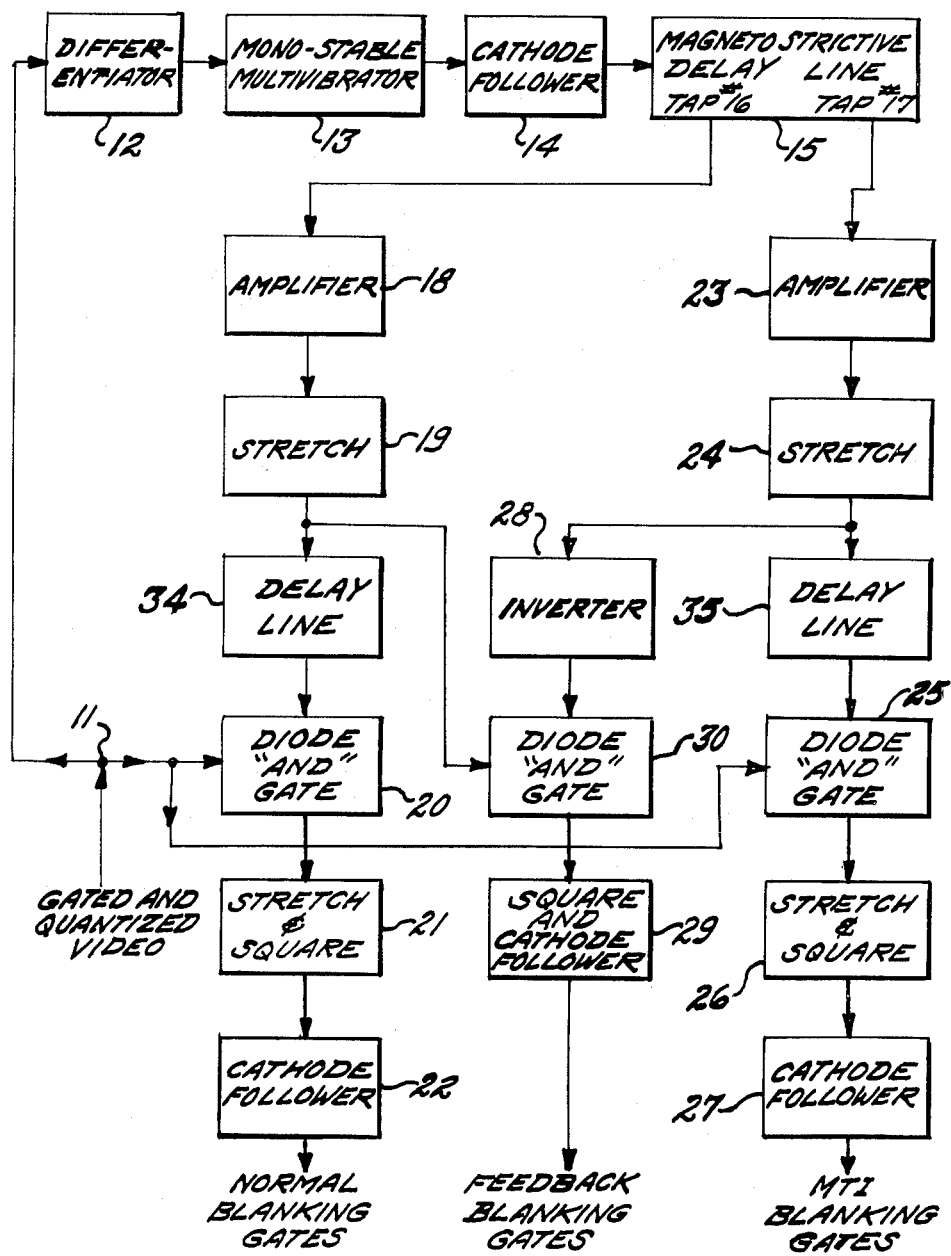
FIGURE 2 shows the block diagram of FIGURE 1 with the addition of a video lumped constant delay line.

Referring now to FIGURE 2, it can be seen that the only difference between FIGURE 1 and FIGURE 2 is the addition of a video lumped constant delay line in series with the delayed blanking gates; delay line 34 is placed between stretch circuit 19 and "and" gate 20, and delay line 35 is placed between stretch circuit 24 and diode "and" gate 25. The total delay of the delayed blanking gates is the same as previously described causing normal blanking gates to be generated.

The same delay line and correspondingly earlier tap is used in the moving target indicator channel which also operates the same as previously described.

In order to generate feedback blanking gates, once delayed video is taken from the normal channel previous to the delay line and sent to diode "and" gate 30. Thrice delayed video is taken from the moving target indicator channel, inverted by inverter 28 and used as a blanking gate to gate 30 where it blanks out all but the second and third period pulses. These pulses are then squared and sent to the canceller by circuit 29; the feedback is therefore blanked out in the canceller.

With the pulse interference detector in operation, any normal video target will have the first bit blanked. If it is a twenty bit target, nineteen will reach the display. If it is a one bit interference pulse, jamming pulses, or rabbit, nothing will reach the display.

Any moving target indicator video target will have the first three bits blanked. If it is a twenty bit target which would normally produce twenty-two to the display, there will be three less or nineteen to the display. (More if the canceller has velocity shaping.) If it is a one bit interference pulse, jamming pulse, or rabbit, nothing will reach the display.

The pulse interference detector function was formerly accomplished with a totally different approach using forty-eight tubes and an expensive quartz delay line. The scheme described above uses only eleven tubes and an inexpensive magnetostrictive delay line.

While specific embodiments have been described in some detail, it is obvious that numerous changes may be made without departing from the general principles and scope of the invention.

I claim:
1. A system for removing interference from a radar display, comprising a source of video pulses, two signal paths fed in parallel from said pulse source, means for standardizing the pulse width of said video pulses in one of said paths, means for delaying said standardized pulse, two coincident gates fed in parallel in the other of said signal paths, means for feeding each coincident gate with a delay pulse from said delay means to provide output pulses for blanking out interference.

2. A system as claimed in claim 1 wherein the delay means comprise a magnetostrictive delay line with taps to provide variable delays.

3. A system as claimed in claim 1 wherein the means for standardizing the pulse width comprise a differentiating circuit triggering a monostable multivibrator.

No references cited.

LEWIS H. MYERS, *Primary Examiner.*

R. D. BENNETT, *Assistant Examiner.*